(12) United States Patent
Horn

(10) Patent No.: US 11,657,848 B1
(45) Date of Patent: May 23, 2023

(54) DATA ACCESS AND LOGICAL MAPPING FOR MAGNETIC DISKS

(71) Applicant: Western Digital Technologies, Inc., San Jose, CA (US)

(72) Inventor: Robert Horn, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/679,565

(22) Filed: Feb. 24, 2022

(51) Int. Cl.
*G11B 5/00* (2006.01)
*G11B 21/10* (2006.01)
*G11B 5/012* (2006.01)

(52) U.S. Cl.
CPC ............ *G11B 21/106* (2013.01); *G11B 5/012* (2013.01)

(58) Field of Classification Search
CPC .. G11B 5/54; G11B 27/36; G11B 5/00; G11B 5/09; G11B 2220/0021; G11B 15/087; G11B 15/52; G11B 5/59633; G11B 5/5543; G06F 3/0644; G06F 3/0604; G06F 2212/657; G06F 3/0679; G06F 15/005
USPC ......................................... 360/75, 72.1, 72.3
See application file for complete search history.

(56) References Cited

U.S. PATENT DOCUMENTS

| | | | |
|---|---|---|---|
| 6,307,700 B1 | 10/2001 | Takayama | |
| 8,019,925 B1 | 9/2011 | Vogan et al. | |
| 8,443,167 B1 | 5/2013 | Fallone et al. | |
| 8,526,136 B2 | 9/2013 | Katagiri et al. | |
| 8,654,476 B2 | 2/2014 | Katagiri et al. | |
| 8,867,160 B2 | 10/2014 | Katagiri et al. | |
| 2001/0020260 A1* | 9/2001 | Kanamaru | G06F 3/0676 711/112 |
| 2003/0023778 A1 | 1/2003 | Berning et al. | |
| 2010/0131805 A1* | 5/2010 | Katsuragi | G06F 11/0751 710/22 |
| 2011/0283052 A1 | 11/2011 | Mukaida | |
| 2014/0201590 A1* | 7/2014 | Coker | H03M 13/1102 714/769 |
| 2019/0324688 A1* | 10/2019 | Kang | G11C 16/26 |
| 2020/0065018 A1* | 2/2020 | Hong | G06F 3/0679 |
| 2022/0035563 A1 | 2/2022 | Miyamura et al. | |

OTHER PUBLICATIONS

Pending U.S. Appl. No. 17/317,018, filed May 11, 2021, entitled "Data Storage Device Using Predefined Data Segments for Logical Address Mapping", by Robert L. Horn.

* cited by examiner

*Primary Examiner* — Nabil Z Hindi
(74) *Attorney, Agent, or Firm* — Barry IP Law, P.C.

(57) ABSTRACT

A Data Storage Device (DSD) includes one or more magnetic disks with each magnetic disk including at least one recording surface. A segment mapping is generated having a predetermined number of segment entries per recording surface with each segment entry corresponding to a data segment of the recording surface. One or more segment entries include a first logical address corresponding to a first logical data block that begins in the corresponding data segment and at least one of the data segments is configured to store multiple logical data blocks. A target segment entry is located in the segment mapping corresponding to a highest logical address less than or equal to a requested logical address of a read command and a head of the DSD is moved to a beginning portion of a target data segment corresponding to the target segment entry to perform the read command.

20 Claims, 6 Drawing Sheets

| Data Seg. | 1ST L.A. | Rec. Surface |
|---|---|---|
| Data Seg. 1 | a | 134 |
| Data Seg. 2 | b | 134 |
| Data Seg. 3 | c | 134 |
| Data Seg. 4 | d | 134 |
| Data Seg. 5 | e | 134 |
| Data Seg. 6 | f | 134 |
| Data Seg. 7 | g | 136 |
| Data Seg. 8 | h | 136 |
| Data Seg. 9 | i | 136 |
| Data Seg. 10 | j | 136 |
| Data Seg. 11 | k | 136 |
| Data Seg. 12 | l | 136 |
| Data Seg. 13 | m | 138 |
| Data Seg. 14 | n | 138 |
| Data Seg. 15 | o | 138 |
| Data Seg. 16 | p | 138 |
| Data Seg. 17 | - | 138 |
| Data Seg. 18 | q | 138 |
| Data Seg. 19 | r | 142 |
| Data Seg. 20 | s | 142 |
| Data Seg. 21 | t | 142 |
| Data Seg. 22 | u | 142 |
| Data Seg. 23 | v | 142 |
| Data Seg. 24 | w | 142 |

DATA ACCESS AND LOGICAL MAPPING FOR MAGNETIC DISKS

BACKGROUND

Data Storage Devices (DSDs) are often used to record data in or to reproduce data from a storage medium. One type of storage medium includes a rotating magnetic disk, such as in a Hard Disk Drive (HDD) or a Solid-State Hybrid Drive (SSHD) that includes both a rotating magnetic disk and a non-volatile solid-state memory. In such DSDs, a head is positioned in relation to a recording surface on the disk to magnetically read and write data in concentric tracks on the recording surface.

The amount of data that can be stored on a disk in a given area (i.e., an areal density) generally continues to increase with each new generation of DSDs that use a disk to store data. Shingled Magnetic Recording (SMR) has been introduced as a way of increasing the number of Tracks Per Inch (TPI) by making the tracks narrower. Since it is technologically easier to read narrow tracks than to write narrow tracks, SMR increases TPI by using a shingle write head with a stronger magnetic field to overlap tracks like roof shingles. The non-overlapping portion then serves as a narrow track that can be read by a narrower read head. However, this overlap can create a problem when writing data since new writes to a previously overlapped track affects data written in the overlapped track. For this reason, SMR tracks are typically written sequentially so that the newly written data does not affect the data previously written in adjacent tracks.

Other new technologies have been introduced or are in development to allow DSD heads to write more data in a given area using various energy-assisted recording techniques. Such energy-assisted recording techniques can include, for example, Thermal Fly-Height Control (TFC), Heat Assisted Magnetic Recording (HAMR), and Microwave Assisted Magnetic Recording (MAMR).

As a result of the increasing storage capacity of magnetic disks, there is an increased need for memory in the DSD, such as Dynamic Random Access Memory (DRAM), to store and maintain mapping tables that map the logical addresses of data to the physical locations on the disk that store the data. The larger mapping tables required by the increased data storage capacity of newer magnetic disks consume more memory, which can be expensive and increase the overall cost of the DSD. In addition, the larger mapping tables can lead to an increased consumption of processing resources in performing operations using the mapping tables.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Data Storage Device Examples

Figure 1:
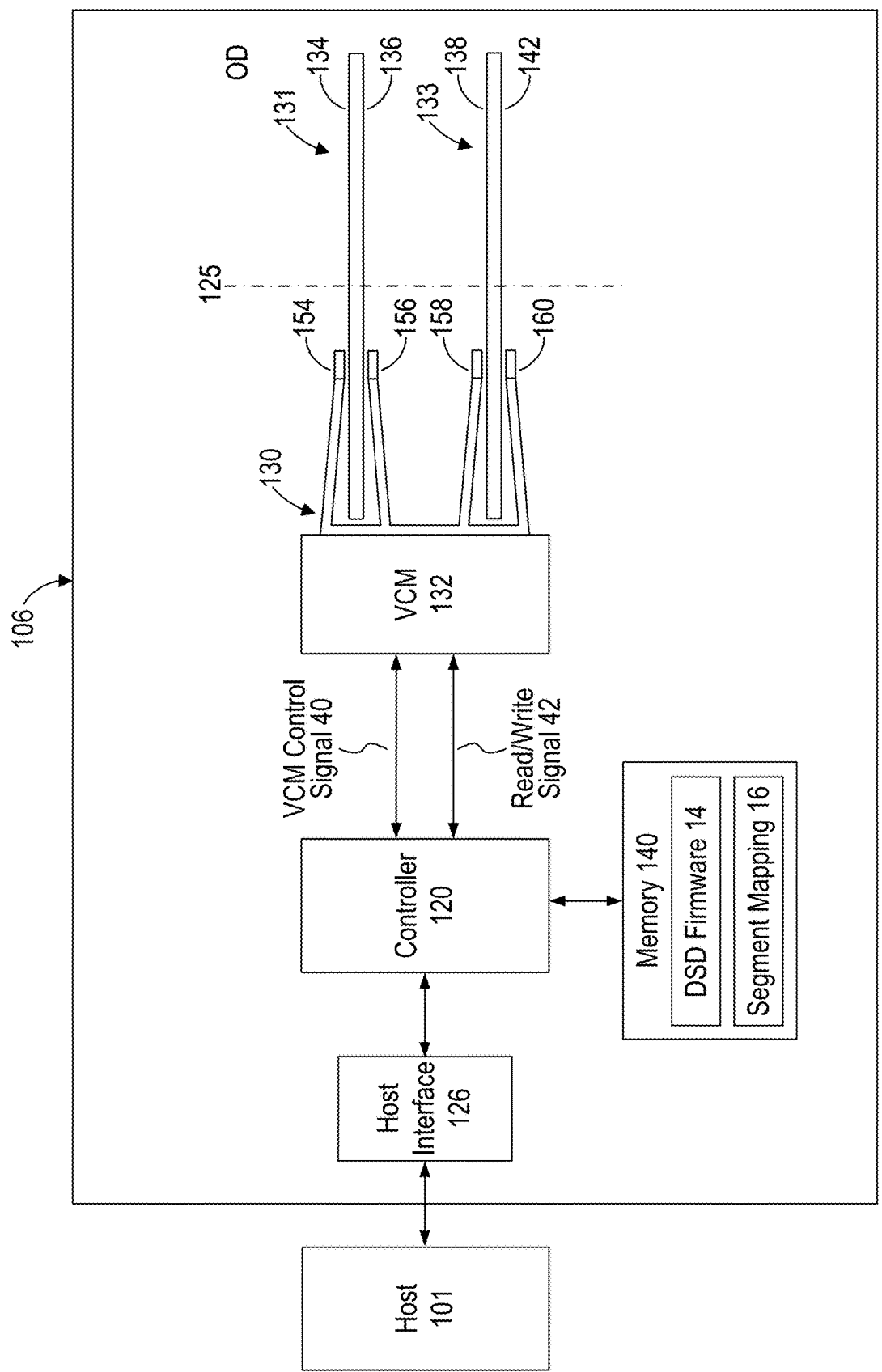
FIG. 1 is a block diagram of a Data Storage Device (DSD) including at least one rotating magnetic disk according to one or more embodiments.

FIG. 1 is a block diagram of a Data Storage Device (DSD) 106 according to one or more embodiments. As shown in the example of FIG. 1, DSD 106 includes Non-Volatile Memory (NVM) in the form of rotating magnetic disks 131 and 133. In other implementations, DSD 106 may include a different number of disks or a different type of NVM such as a solid-state memory in addition to rotating magnetic disks.

In the example of FIG. 1, host 101 communicates with DSD 106 to retrieve data from and store data on disks 131 and 133 of DSD 106. Host 101 and DSD 106 may be separate devices or may be housed together as part of a single electronic device, such as, for example, a server, computing device, desktop, laptop or notebook computer, or other type of electronic device such as a network media player, portable media player, television, digital camera, or Digital Video Recorder (DVR). As used herein, a host can refer to a device that can issue commands to a DSD to store data or retrieve data. In this regard, host 101 may include another storage device such as a smart DSD that can execute applications and communicate with other DSDs.

DSD 106 includes controller 120 which includes circuitry such as one or more processors for executing instructions including a Central Processing Unit (CPU), microcontroller, Digital Signal Processor (DSP), Application-Specific Integrated Circuit (ASIC), Field Programmable Gate Array (FPGA), Graphics Processing Unit (GPU), hard-wired logic, analog circuitry and/or a combination thereof. In some implementations, controller 120 can include a System on a Chip (SoC), which may be combined with one or both of host interface 126 and memory 140.

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS), Ethernet, or WiFi, and/or one or more other standards. As will be appreciated by those of ordinary skill in the art, host interface 126 can be included as part of controller 120. Although FIG. 1 depicts the co-location of host 101 and DSD 106, in other implementations the two need not be physically co-located. In such implementations, DSD 106 may be located remotely from host 101 and connected to host 101 via a network interface.

In the example of FIG. 1, disks 131 and 133 form a disk pack that is rotated by a spindle motor (not shown) about axis 125. Heads 154, 156, 158, and 160 are positioned to read and write data on a corresponding recording surface of disks 131 or 133. Each of recording surfaces 134, 136, 138, and 142 includes a number of radially spaced, concentric tracks for storing data that are arranged in one or more data segments, which is discussed in more detail below with reference to FIG. 2.

Heads 154, 156, 158, and 160 are connected to the distal end of actuator 130 which is rotated by Voice Coil Motor (VCM) 132 to position heads 154, 156, 158, and 160 over tracks on disk surfaces 134, 136, 138, and 142, respectively. Controller 120 can include servo control circuitry (not shown) to control the rotation of disks 131 and 133, and to control the position of the heads using VCM control signal 40.

Memory 140 of DSD 106 is configured to store DSD firmware 14 and segment mapping 16. DSD firmware 14 can include computer executable instructions for execution by controller 120 to operate DSD 106. In some implementations, controller 120 may execute DSD firmware 14 to perform the processes of FIGS. 5 to 7 discussed below. In addition, memory 140 may be used to temporarily store data that has been read from recording surfaces 134, 136, 138, and 142 and/or to temporarily store data that is to be written to recording surfaces 134, 136, 138, and 142.

In the example of FIG. 1, memory 140 can be a volatile memory such as Dynamic Random Access Memory (DRAM) or Static Random Access Memory (SRAM) with copies of DSD firmware 14 and segment mapping 16 stored in an NVM, such as on disks 131 or 133, or in another NVM of DSD 106. In other implementations, memory 140 can include a non-volatile memory or other type of solid-state memory, such as a Storage Class Memory (SCM).

While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), Fast NAND, 3D-XPoint memory, NAND memory (e.g., Single-Level Cell (SLC) memory, Multi-Level Cell (MLC) memory (i.e., two or more levels), or any combination thereof), NOR memory, EEPROM, other discrete NVM chips, or any combination thereof.

Segment mapping 16 maps logical addresses to data segments on recording surfaces 134, 136, 138, and 142. In some implementations, the logical addresses of segment mapping 16 can be used by host 101 to identify files or data objects that are sequentially written by host 101. Unlike Logical Block Addresses (LBAs) conventionally used by hosts to identify data, the logical data blocks of the present disclosure that are identified by the logical addresses are not expected or required to be of equal size or an integer number of any storage units supported internally by the DSD, such as a fixed number of sectors, tracks, or zones of tracks.

In contrast to segment mapping 16, the mapping tables of conventional DSDs typically provide a one-to-one mapping of logical addresses (e.g., LBAs) to the data blocks on a recording surface. The data blocks in conventional systems typically correspond to a data size used by the host for referencing data, such as 512 bytes, and may also correspond to the amount of data stored in physical sectors on the disk, which is usually 512 bytes or 4,096 bytes. Due to the fine granularity of this one-to-one mapping of logical addresses to data blocks on the disk, conventional mapping tables have significantly increased in size with the larger storage capacities or aerial densities of newer recording surfaces that can be written using technologies, such as Shingled Magnetic Recording (SMR), Thermal Fly-Height Control (TFC), Heat Assisted Magnetic Recording (HAMR), and Microwave Assisted Magnetic Recording (MAMR). As a result, the amount of memory needed to store such conventional mapping tables has significantly increased.

The present disclosure uses a different type of mapping that is facilitated by the sequential writing of data on the recording surfaces or within a data segment on a recording surface. In this regard, data is sequentially written within a data segment from a lowest logical address for the data segment to a highest logical address for the data segment. As discussed in more detail below with reference to FIGS. 2 to 4, segment mapping 16 includes a predetermined number of segment entries per recording surface with each segment entry corresponding to a data segment of the recording surface and one or more segment entries including a first logical address corresponding to a first logical data block that begins in the corresponding data segment. This arrangement enables a significantly more compact mapping that requires less memory as compared to conventional mapping tables.

In operation, host interface 126 receives host read and write commands from host 101 via host interface 126 for reading data from and writing data to recording surfaces of disks 131 and 133. In response to a write command from host 101, controller 120 may buffer the data to be written for the write commands in memory 140. The data may be written sequentially in terms of its logical addressing onto at least a portion of one or more of recording surfaces 134, 136, 138, and 142. In some implementations, the data may be written in overlapping tracks using SMR.

As discussed in more detail below, the sequential writing of data in terms of its logical addressing can enable segment mapping 16 to include only a first logical address for segment entries in the segment mapping, as opposed to logical addresses for every data block. Each segment entry in the segment mapping represents a data segment on the recording surface that can include multiple logical data blocks corresponding to different logical addresses.

For data to be written on a recording surface, a read/write channel (not shown) of controller 120 may encode the buffered data into write signal 42 which is provided to a head for magnetically writing data on a recording surface that has been assigned the logical addresses for the data in the write command. In addition, controller 120 via a servo system (not shown) can provide VCM control signal 40 to VCM 132 to position the head over a particular track for writing the data.

In response to a read command for data stored on disk 131 or 133, a target segment entry can quickly be located in segment mapping 16 corresponding to the highest logical address that is less than or equal to a requested logical address of the read command. Controller 120 via a servo system seeks a head for the appropriate recording surface to a beginning portion of a target data segment on the recording surface corresponding to the target segment entry identified in segment mapping 16. Controller 120 controls the head to magnetically read data stored in the target data segment and to send the read data as read signal 42.

The target data segment is read from the beginning portion of the target data segment to search for a logical data block corresponding to the logical address of the read command, which can be read from a header of the logical data block on the recording surface. A logical data block can correspond to one or more physical sectors on the recording surface that are identified by the same logical address. After reading the logical data block corresponding to the logical address of the read command, a read/write channel of controller 120 can then decode and buffer the read data into memory 140 for transmission to host 101 via host interface 126.

As will be appreciated by those of ordinary skill in the art, other implementations of DSD 106 may include different arrangement of components than shown in the example of FIG. 1. For example, other implementations may include one or more solid-state memories for non-volatilely storing data in addition to disks 131 and 133, as in the case of a Solid-State Hybrid Drive (SSHD). As another example, other implementations may include a different number of disks and recording surfaces than shown in FIG. 1. As another example variation, some implementations may include both segment mapping 16 for sequentially written recording surfaces or portions thereof, and a conventional mapping table for non-sequentially written recording surfaces or portions thereof, or for other types of NVM, such as a non-volatile solid-state memory.

Figure 2:
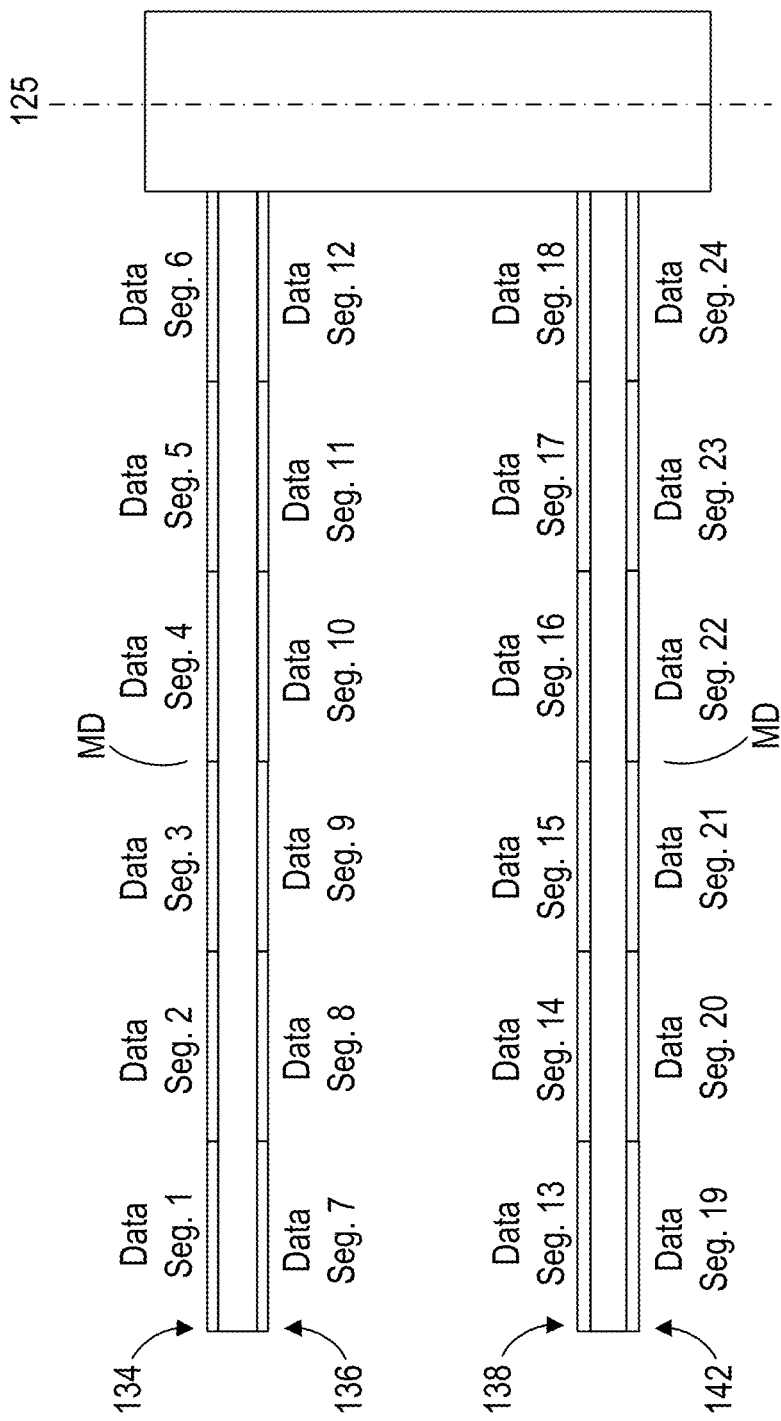
FIG. 2 illustrates data segments on disk surfaces of a DSD according to one or more embodiments.

FIG. 2 illustrates data segments on recording surfaces 134, 136, 138, and 142 according to one or more embodiments. As discussed in more detail below, each data segment for a recording surface can include an equal, predetermined number of physical constructs on the recording surface, such as the same number of physical sectors, tracks, or zones of tracks. The data segments may store different amounts of data, such as where each data segment comprises a predetermined number of tracks since more data is stored in Outer Diameter (OD) tracks than Inner Diameter (ID) tracks. In addition, defective sectors may be discovered in the field as part of a write-verify operation performed for a host write command, which would reduce the amount of data stored in the data segment since those physical sectors would not store usable data. In some implementations, certain tracks may be mapped-out as part of a factory servo write test process if the physical sectors could cause damage to a head. Such tracks can be subtracted from the count of usable tracks used for setting the boundaries of the data segments in some implementations. As discussed in more detail below with reference to FIG. 3, logical data blocks are sequentially written in the data segments, for example, in response to write commands for the logical data blocks being received from host 101.

Although the example of FIG. 2 shows each recording surface as having the same number of data segments, other implementations may use different numbers of data segments for different recording surfaces. In addition, the ordering of data segments across a recording surface may differ from the arrangement shown in FIG. 2 where the logical addresses for data segments increment from an Outer Diameter OD location towards an ID location. For example, other embodiments may have data segments in a butterfly arrangement where the logical block addresses increment from both the OD location and the ID location towards a Middle Diameter (MD) location.

Those of ordinary skill in the art will appreciate with reference to the present disclosure that other implementations may include a different arrangement than shown in FIG. 2. For example, those of ordinary skill in the art will appreciate that recording surfaces can have significantly more than six data segments as shown in FIG. 2. Similarly, other implementations may include one or more recording surfaces, or portions thereof, that are not sequentially written and do not include a data segment corresponding to a segment entry in segment mapping 16. As noted above, such areas of a recording surface can be logically mapped using a conventional mapping table having a finer granularity than segment mapping 16 by mapping logical addresses to the smaller logical data blocks on the recording surface.

Figures 3, 4:
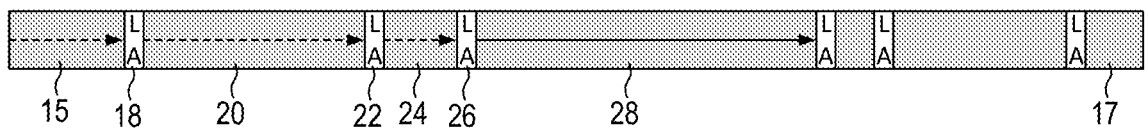
FIG. 3 illustrates an example of a data segment according to one or more embodiments.
FIG. 4 is an example of a segment mapping according to one or more embodiments.

FIG. 3 illustrates an example where data segment 3 from FIG. 2 has been written with multiple logical data blocks including logical data blocks 20, 24, and 28. Data segment 3 in FIG. 3 also includes a residual portion 15 of a logical data block written at the end of data segment 2 and a beginning portion 17 of a logical data block that starts in data segment 3 and continues into data segment 4. Each logical data block that begins in data segment 3 has a header including a Logical Address (LA) identifying the logical data block, such as with LA 18 written in a header for logical data block 20.

When writing the logical data blocks sequentially to the recording surface, the increasing order of the LAs in the one or more headers in the data segment enables compaction in the segment mapping 16. FIG. 4 shows an example segment mapping 16 including segment entries that each correspond to a data segment shown in FIG. 2, such that there are 24 segment entries in segment mapping 16 of FIG. 4 that correspond to the 24 data segments shown in FIG. 2. As shown in FIG. 4, most of the segment entries in segment mapping 16 include a first logical address corresponding to a first logical data block stored in the corresponding data segment. For example, the segment entry corresponding to data segment 3 of FIG. 3 includes the LA 18 of logical data block 20 that is represented in FIG. 4 by the generic value "c" in the first LA column since logical data block 20 is the first logical data block that begins in data segment 3. In the case of the segment entry corresponding to data segment 17, there is not a first logical address since the entire data segment includes part of one logical data block that begins in the previous data segment 16 and continues into the next data segment 18.

When a read command is received from the host to read a logical data block, such as for a file or a data object, segment mapping 16 may be searched based on the logical address of the read command using, for example, a binary search, to locate the data segment storing the logical data block. In some implementations, controller 120 may calculate a physical location in terms of a Physical Block Address (PBA) for the beginning of the target data segment by multiplying a number for the target data segment on the recording surface by a predetermined number of physical sectors for each data segment and subtracting out any physical sectors from tracks before the target data segment that may have been mapped out due to head damaging defects. Controller 120 then seeks the appropriate head to the beginning portion of the target data segment and begins reading the target data segment including the headers of the logical data blocks until the target logical data block is located. After reading the target logical data block, controller 120 may then stop reading in the target data segment. In cases where the target logical data block extends into the next data segment, controller 120 continues reading from the target data segment into the next data segment to complete reading the target logical data block.

Referring again to the example of FIG. 3, when a read command is received to read logical data block 28, controller 120 seeks the head to the beginning portion of data segment 3 in FIG. 3 and begins reading the data segment. While reading the data segment, controller 120 may skip over residual portion 15 and logical data blocks 20 and 24, and when the head reaches logical data block 28, the full logical data block is read and transferred to host 101. In this regard, skipping over a logical data block can include reading only data from a header for the logical data block, such as the logical address, and not buffering the data for the logical data block. This is indicated by the dashed in lines in the example of FIG. 3 for residual portion 15 and logical data blocks 20 and 24. The solid line for logical data block 28 indicates that the full logical data block is read and is not skipped over. The lack of arrows in the logical data blocks that follow logical data block 28 can indicate that these logical data blocks are not read.

In other implementations, skipping over a logical data block can mean that the controller only reads an indicator of a new logical data block without even reading the logical address from the header. In such implementations, the controller can increment the first read logical address for the data segment until reaching the target logical data block, which is fully read by the controller for performing the read command.

In some implementations, segment mapping 16 may be quickly searched for a target segment entry corresponding to the highest logical address that is less than or equal to the logical address (e.g., a starting logical address) of the read command using, for example, a binary search, a B-tree, a skip list or other type of probabilistic data structure, or interpolation based on an average number of logical data blocks per data segment. The use of segment mapping, such as segment mapping 16, where data segments are represented by a first logical address of a logical data block beginning in the data segment can significantly reduce the size of the logical mapping to physical locations on a recording surface as compared to conventional mappings that store mapping information for each logical data block. The granularity of the segment mapping, and therefore the size of the data segments, can be selected based on a balance between a desired reduced memory usage of the segment mapping and an increased latency caused by searching larger sized data segments.

The segment entries of segment mapping 16 in FIG. 4 also include an indication of the recording surface where the data segment is located. The location of the boundaries of the data segments can be set by, for example, controller 120 counting the physical sectors or tracks from a beginning location of the recording surface and subtracting out the number of tracks or physical sectors of tracks that may have been mapped-out due to defects that could cause damage to a head, such as disk asperities. The resulting count of physical sectors or tracks can then be equally divided into the same number of physical sectors or tracks for the data segments of the recording surface.

Those of ordinary skill in the art will appreciate with reference to the present disclosure that other implementations may include a different arrangement of segment mapping 16 and may include a different number of segment entries, such as hundreds or thousands of segment entries. In some implementations, segment mapping 16 can include, for example, a table or other type of data structure, or may include separate data structures for different recording surfaces. As another example variation, other implementations may not include a sector count or a mapped-out sector count and may locate a target data segment on the recording surface using a different technique. As another example variation, segment mapping 16 may not include a separate column identifying the data segment since the data segment may instead be identified by the first logical address for the data segment.

Example Processes

Figure 5:
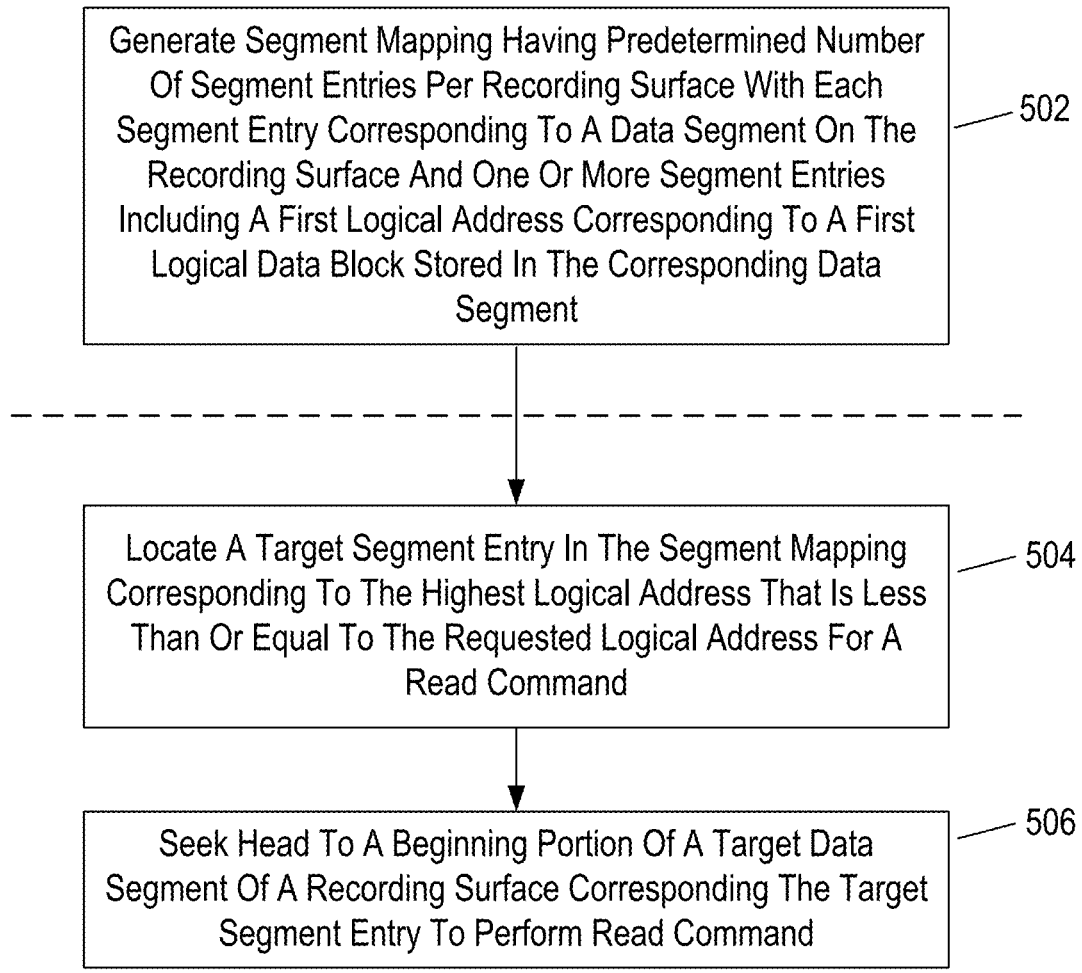
FIG. 5 is a flowchart for a read process using a segment mapping according to one or more embodiments.

FIG. 5 is a flowchart for a read process using a segment mapping according to one or more embodiments. The process of FIG. 5 can be performed by circuitry of a DSD executing a firmware of the DSD, such as controller 120 executing DSD firmware 14 in FIG. 1.

In block 502, the circuitry generates a segment mapping having a predetermined number of segment entries per recording surface with each segment entry corresponding to a data segment on the recording surface. In addition, the segment entries include a first logical address corresponding to a first logical data block that begins in the corresponding data segment. As discussed above with reference to FIG. 4, some segment entries may not include a logical address if there are no logical data blocks that begin in the corresponding data segment. The generation of a segment mapping in block 502 may occur as data is written to recording surfaces of the DSD. In this regard, the dashed line after block 502 indicates that the generation of the segment mapping may occur at a different time from the operations performed in blocks 504 and 506.

In some implementations, the segment mapping may be created at the factory by a manufacturer as part of an initial disk formatting or mapping process. In such implementations, the segment mapping can include a predetermined number of segment entries corresponding to equally sized data segments on the recording surfaces in terms of a number of physical sectors, a number of tracks, or a number of zones of tracks. As data is written to the recording surfaces during operation, the segment entries may be populated with logical addresses corresponding to the first logical address of a first logical data block written in the data segment. As discussed above with the example of FIG. 3, the logical addresses may be included in respective headers of the logical data blocks.

In block 504, a target segment entry is located in the segment mapping in response to a read command, which may come from a host (e.g., host 101 in FIG. 1) or from a controller of the DSD as part of a maintenance operation performed by the DSD, such as rewriting a zone of tracks on the recording surface to maintain integrity of the data. The target segment entry in the segment mapping includes a highest logical address that is less than or equal to the requested logical address for the read command. In some cases, the read command can reference a beginning logical address or a logical address range for logical data blocks to be read. The circuitry can use this beginning logical address or the lowest logical address in the requested range to search the segment mapping for the segment entry having the greatest logical address that is less than or equal to the beginning logical address for the read command. In cases where the requested logical address for the read command is equal to the first logical address for the segment entry, the requested logical address is the lowest and first logical address in the data segment corresponding to the segment entry. In other cases where the requested logical address for the read command is greater than the logical address for the segment entry, the circuitry will read or scan from the first logical data block that begins in the data segment until reaching the requested data block.

In block 506, the circuitry seeks a head for the recording surface that includes the target data segment to the beginning portion of the target data segment. In some implementations, the circuitry may use a total number of physical sectors from a beginning location on the recording surface to the target data segment minus a number of physical sectors from tracks that have been mapped-out to determine where to seek the head.

For example, the circuitry may calculate the total number of sectors from the beginning location to the target data segment by multiplying a data segment number for the target data segment on the recording surface (e.g., the fifth data segment on the recording surface from the beginning location) by a fixed number of physical sectors set for each data segment (i.e., the data segment length). This total number or count of physical sectors from the beginning location to the start of the target data segment can be reduced by the number of physical sectors from mapped-out tracks (if any) between the beginning location and the location corresponding to the total count of physical sectors. In some implementations, this provides the circuitry with a PBA for the beginning of the target data segment.

After reaching the target data segment, the circuitry can read the headers of the logical data blocks in sequential order until reaching the target logical data block. The circuitry may then read the full logical data block for the target data block to perform the read command.

Those of ordinary skill in the art will appreciate with reference to the present disclosure that the order of blocks for the read process of FIG. 5 may differ in other implementations. For example, the segment mapping generation in block 502 and the operations of blocks 504 and 506 may repeat in different orders since the generation of the segment mapping may continue over time as new logical data blocks are written to previously unwritten data segments and new read commands are performed as the segment mapping is further populated with logical addresses.

Figure 6:
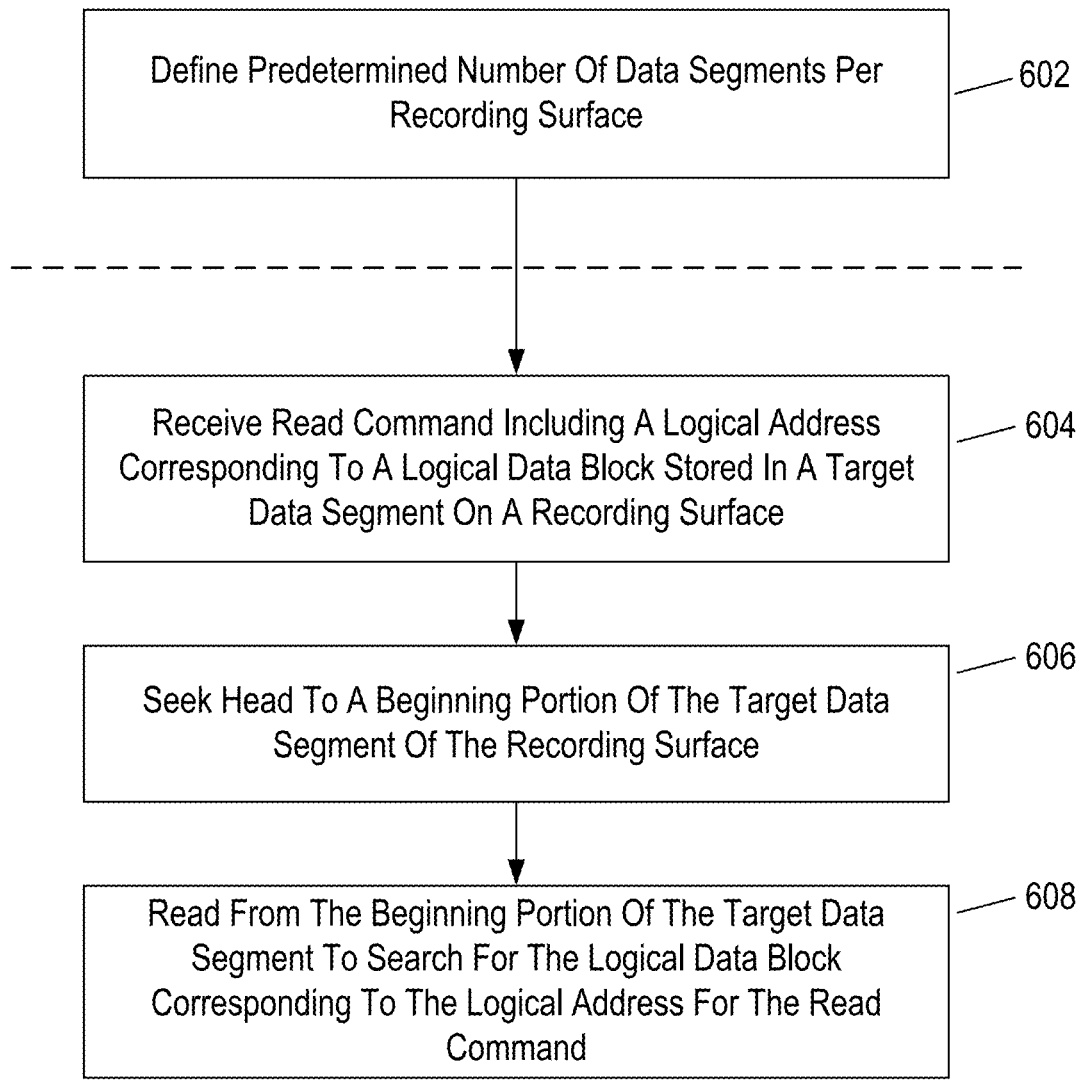
FIG. 6 is a flowchart for a read process using defined data segments according to one or more embodiments.

FIG. 6 is a flowchart for a read process using defined data segments according to one or more embodiments. The process of FIG. 6 can be performed by circuitry of a DSD executing a firmware of the DSD, such as controller 120 executing DSD firmware 14 in FIG. 1.

In block 602, the DSD defines a predetermined number of data segments per recording surface. In some implementations, the data segments may be defined at the factory by a manufacturer as part of an initial disk formatting or mapping process. The dashed line after block 602 indicates that the definition of the predetermined number of data segments may occur at a different time before the receipt of read commands, which may occur during operation in the field.

As discussed above with reference to FIG. 2 the data segments are equally sized in terms of a physical construct of the recording surface in each data segment, such as an equal number of physical sectors, tracks, or zones of tracks. In some implementations, each recording surface may have, for example, hundreds or thousands of data segments. The data segments may be defined in some implementations by a first physical address for each data segment. The definition of the data segments may be part of a segment mapping generation, as discussed above for block 502 of FIG. 5. The data segments may take up different amounts of physical area on the recording surface due to, for example, varying circumferences of tracks on the recording surface or tracks that have been mapped-out due to disk asperities that may cause damage to a head.

In block 604, a read command is received that includes a logical address corresponding to a logical data block stored in a target data segment on a recording surface. The read command may come from a host or may come from the controller of the DSD to perform a maintenance operation, such as reading and rewriting a zone of tracks to maintain data integrity. The logical address in the read command can indicate the beginning of the data to be read, such as with a range of requested logical addresses. As discussed above with reference to block 606 of FIG. 6, the DSD may search a segment mapping to locate a target segment entry corresponding to the target data segment. The target segment entry in the segment mapping includes a highest logical address that is less than or equal to the lowest requested logical address for the read command.

In block 606, the circuitry seeks a head for the recording surface to the target data segment on the recording surface that includes one or more logical data blocks corresponding to the requested logical address or addresses for the read command. The circuitry may begin reading from a beginning portion of the data segment by, for example, seeking the head to the first physical sector of the target data segment. In some implementations, the circuitry may calculate the PBA of the first physical sector of the target data segment by multiplying a data segment number for the recording surface by the number of physical sectors in each data segment, and subtracting out any physical sectors for mapped-out tracks.

After reaching the target data segment, the circuitry in block 608 reads from the beginning portion of the target data segment to search for the logical data block corresponding to the logical address of the read command. In some implementations, the circuitry can read the headers of the logical data blocks in the target data segment in sequential order until reaching the target logical data block, thereby skipping over the logical data blocks from the beginning portion of the target data segment until reaching the target logical data block for the read command. The circuitry may then read the full target logical data block to perform the read command.

Those of ordinary skill in the art will appreciate with reference to the present disclosure that the order of blocks for the read process of FIG. 6 may differ in other implementations. For example, the operations of blocks 604 to 608 may repeat in different orders and with different frequencies over time as read commands are received and performed. In this regard, multiple read commands may be queued or deferred in block 604 before performing any seeking or reading for the read commands to reduce an overall time for performing the read commands, as discussed below for the read command sorting process of FIG. 7.

Figure 7:
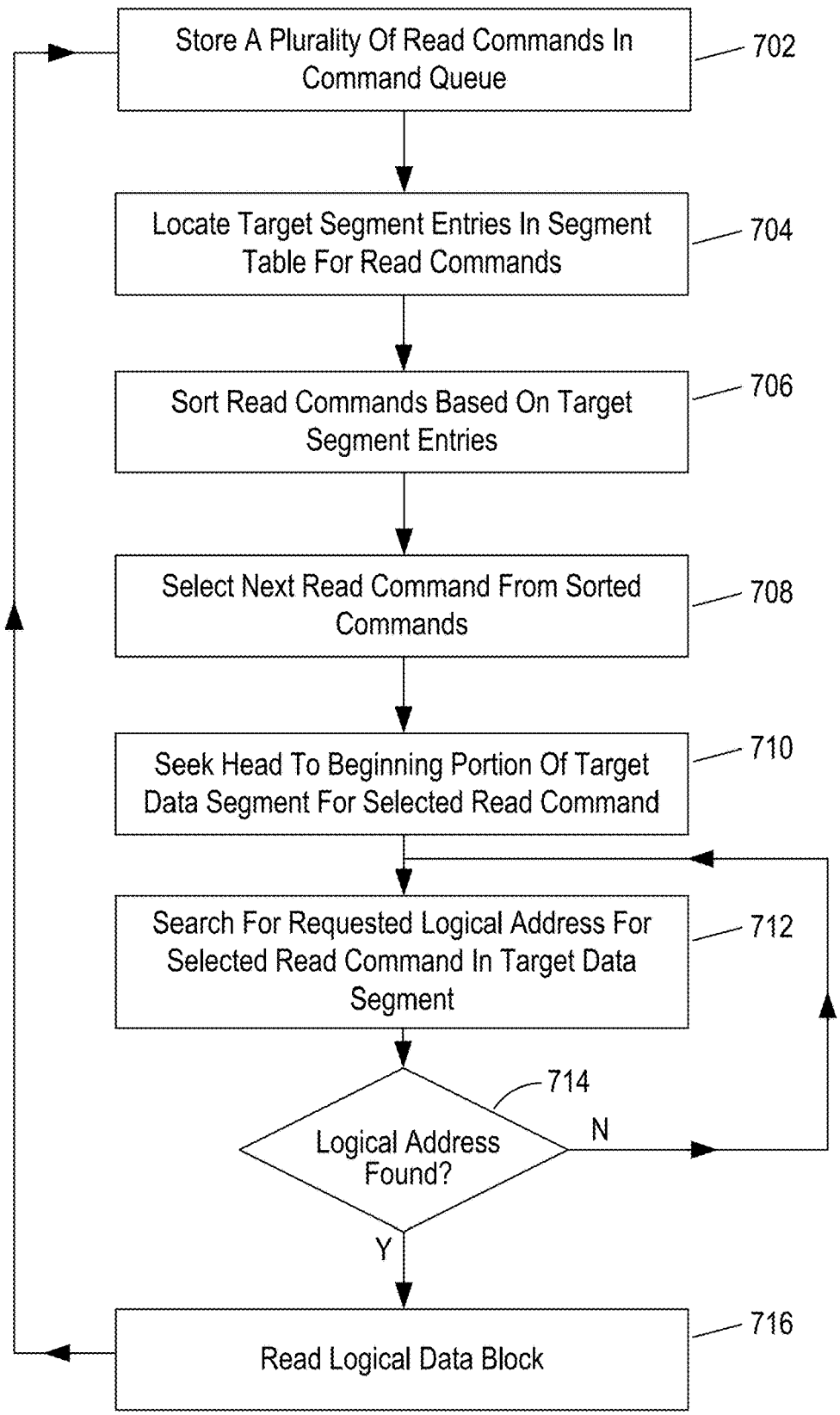
FIG. 7 is a flowchart for a read command sorting process according to one or more embodiments.

FIG. 7 is a flowchart for a read command sorting process using a segment mapping according to one or more embodiments. The process of FIG. 7 can be performed by circuitry of a DSD executing a firmware of the DSD, such as controller 120 executing DSD firmware 14 in FIG. 1.

In block 702, the circuitry stores a plurality of read commands in a command queue in a memory, such as in memory 140 of FIG. 1. The read commands may come from one or more hosts and/or for a maintenance operation performed by the DSD.

In block 704, target segment entries are located in a segment mapping for each of the read commands in the command queue. The segment mapping can be searched based on the logical addresses for the respective read commands to find a highest logical address that is equal to or less than the requested logical address for the read command. As discussed above, the segment mapping may be searched using, for example, a binary search, a B-tree, a skip list or other type of probabilistic data structure, or interpolation based on an average number of logical data blocks per data segment. The use of segment mapping as in the present disclosure where data segments are represented by a first logical address of a logical data block that begins in the data segment can significantly reduce the size of the logical to physical mapping as compared to conventional mappings that store mapping information for each logical data block. In addition, the processing time needed to find a target data segment is less than the time needed to locate a particular logical address in a conventional mapping table.

In block 706, the read commands in the command queue are sorted into an execution order based on their respective target segment entries. The read commands can be sorted to minimize the latency in performing the read commands, such as by reducing the amount of movement needed by the actuator that moves the heads over the recording surface or recording surfaces. In this regard, the sorting may consider the radial overlap of data segments on different recording surfaces in addition to a current position of the heads over the recording surfaces. For example, with reference to the example data segments of FIG. 2, the heads for recording surfaces 134, 136, 138, and 142 may be near the MD location and the read commands may be sorted to minimize the radial distance traveled by the actuator to perform all the queued read commands.

In block 708, the circuitry selects the first or next read command to be performed from the sorted read commands and seeks the appropriate head to the beginning portion of the target data segment for the selected read command in block 710. In some implementations, the seeking may be performed by reading servo information from the recording surface, which may provide a total sector count for different locations on the recording surface or other positioning information, such as track numbers.

In block 712, the circuitry searches for the requested logical address of the selected read command in the target data segment. The circuitry may read a first header in the target data segment and, if needed, continue reading the headers of the logical data blocks stored in the target data segment in a sequential order until reaching the target logical data block for the read command. If the requested logical address is not found in block 714, the circuitry continues to search for the requested logical address.

In response to finding the requested logical address for the read command selected in block 708, the full logical data block is read by the circuitry. The data from the logical data block may be decoded and buffered in a memory before sending the read data to a host that issued the read command. The process then returns to block 702 to store any new read commands that may have been received, if any, and locating target segment entries in the segment mapping for the newly received read commands in block 704. The new read command or commands, if any, are then sorted with the existing read commands in the command queue based on their target segment entries.

As discussed above, the foregoing use of segment mapping based on segment entries being identified by a first logical address for a first logical data block that begins in the data segment can significantly reduce the amount of memory needed to logically map logical data blocks to recording surfaces as compared to conventional mapping tables. In addition, processing time for performing read commands can be decreased since the less granular segment mapping of the present disclosure can be searched more quickly to find a target segment entry as compared to searching a conventional mapping table for a particular logical address.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
   one or more magnetic disks, wherein each magnetic disk of the one or more magnetic disks includes at least one recording surface configured to store data;

one or more heads configured to read data from a respective recording surface of the one or more disks; and
circuitry configured to:
    generate a segment mapping having a predetermined number of segment entries per recording surface of the one or more magnetic disks, wherein:
        each segment entry corresponds to a data segment of the recording surface;
        one or more segment entries include a first logical address corresponding to a first logical data block that begins in the corresponding data segment; and
        at least one of the data segments is configured to store multiple logical data blocks;
    locate a target segment entry in the segment mapping corresponding to the highest logical address less than or equal to a logical address for a read command; and
    seek a head of the one or more heads to a beginning of a target data segment of a recording surface of the one or more magnetic disks corresponding to the target segment entry to perform the read command.

2. The DSD of claim 1, wherein a plurality of logical data blocks is stored in the target data segment of the recording surface.

3. The DSD of claim 2, wherein the circuitry is further configured to read from a beginning portion of the target data segment to search for the logical data block corresponding to the logical address for the read command.

4. The DSD of claim 1, wherein the circuitry is further configured to perform a binary search of the segment mapping to locate the target segment entry.

5. The DSD of claim 1, wherein the circuitry is further configured to:
    store a plurality of read commands in a command queue;
    locate target segment entries in the segment mapping corresponding to logical addresses for the plurality of read commands; and
    sort the plurality of read commands into an execution order based on the located target segment entries.

6. The DSD of claim 5, wherein the circuitry is further configured to sort the plurality of read commands into an execution order that minimizes an access latency.

7. The DSD of claim 1, wherein the circuitry is further configured to determine a physical location of the target data segment on the recording surface by at least:
    determining a total number of physical sectors from a beginning location of the recording surface to the target data segment; and
    subtracting from the total number of physical sectors, a number of physical sectors of one or more mapped-out tracks on the recording surface that have defects.

8. A method for accessing data in a Data Storage Device (DSD) including one or more magnetic disks, the method comprising:
    defining a predetermined number of data segments per recording surface of the one or more magnetic disks;
    receiving a read command including a logical address corresponding to a logical data block stored in a target data segment on a recording surface of the one or more magnetic disks;
    seeking a head of the DSD to a beginning portion of the target data segment of the recording surface;
    reading from the beginning portion of the target data segment to search for the logical data block corresponding to the logical address for the read command; and
    skipping over at least one other logical data block in the target data segment while searching for the logical data block corresponding to the logical address for the read command.

9. The method of claim 8, further comprising searching for the logical data block corresponding to the logical address by reading from respective headers of each logical data block of a plurality of logical data blocks stored in the target data segment, a respective logical address or a respective logical data block indicator stored in the respective headers of the plurality of logical data blocks.

10. The method of claim 8, further comprising:
    generating a segment mapping having a predetermined number of segment entries per recording surface, wherein:
        each segment entry corresponds to a data segment of the recording surface;
        one or more segment entries include a first logical address corresponding to a first logical data block that begins in the corresponding data segment; and
        at least one of the data segments stores multiple logical data blocks; and
    locating a target segment entry in the segment mapping corresponding to the logical address for the read command.

11. The method of claim 10, further comprising performing a binary search of the segment mapping to locate the target segment entry.

12. The method of claim 10, further comprising:
    storing a plurality of read commands in a command queue;
    locating target segment entries in the segment mapping corresponding to logical addresses of the plurality of read commands; and
    sorting the plurality of read commands into an execution order based on the located target segment entries.

13. The method of claim 12, further comprising sorting the plurality of read commands into an execution order that minimizes an access latency.

14. The method of claim 8, further comprising determining a physical location of the target data segment on the recording surface by at least:
    determining a total number of physical sectors from a beginning location of the recording surface to the target data segment; and
    subtracting from the total number of physical sectors, a number of physical sectors of one or more mapped-out tracks on the recording surface that have defects.

15. A Data Storage Device (DSD), comprising:
    one or more magnetic disks, wherein each magnetic disk of the one or more magnetic disks includes at least one recording surface configured to store data;
    one or more heads configured to read data from a respective recording surface of the one or more disks;
    means for defining a predetermined number of data segments per recording surface of the one or more magnetic disks;
    means for receiving a read command including a logical address corresponding to a logical data block stored in a target data segment on a recording surface of the one or more magnetic disks;
    means for determining a physical location of the target data segment on the recording surface by at least:
        determining a total number of physical sectors from a beginning location of the recording surface to the target data segment; and subtracting from the total number of physical sectors, a mapped-out number of physical sectors of one or more mapped-out tracks on the recording surface that have defects;

means for seeking a head of the one or more heads to a beginning portion of the target data segment of the recording surface; and means for reading from the beginning portion of the target data segment to search for the logical data block corresponding to the logical address for the read command.

16. The DSD of claim 15, further comprising means for skipping over at least one other logical data block in the target data segment while searching for the logical data block corresponding to the logical address for the read command.

17. The DSD of claim 15, further comprising means for:

generating a segment mapping having a predetermined number of segment entries per recording surface, wherein:

each segment entry corresponds to a data segment of the recording surface;

one or more segment entries include a first logical address corresponding to a first logical data block that begins in the corresponding data segment; and at least one of the data segments stores multiple logical data blocks; and locating a target segment entry in the segment mapping corresponding to the logical address for the read command.

18. The DSD of claim 17, further comprising:

means for storing a plurality of read commands in a command queue;

means for locating target segment entries in the segment mapping corresponding to logical addresses of the plurality of read commands; and means for sorting the plurality of read commands into an execution order based on the located target segment entries.

19. The DSD of claim 1, wherein the circuitry is further configured to search for a logical data block stored in the target data segment that corresponds to the logical address of the read command by reading from respective headers of each logical data block of a plurality of logical data blocks stored in the target data segment, a respective logical address or a respective logical data block indicator stored in the respective headers of the plurality of logical data blocks.

20. The DSD of claim 15, further comprising means for searching for the logical data block corresponding to the logical address by reading from respective headers of each logical data block of a plurality of logical data blocks stored in the target data segment, a respective logical address or a respective logical data block indicator stored in the respective headers of the plurality of logical data blocks.

* * * * *